United States Patent [19]

Peterson et al.

[11] Patent Number: 5,911,150

[45] Date of Patent: *Jun. 8, 1999

[54] DATA STORAGE TAPE BACK-UP FOR DATA PROCESSING SYSTEMS USING A SINGLE DRIVER INTERFACE UNIT

[75] Inventors: Gary S. Peterson, Westboro; Matthew M. Brennan, Leicester, both of Mass.; Robert Decrescenzo, Riverside, R.I.

[73] Assignee: Data General Corporation, Westboro, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/724,966

[22] Filed: Oct. 3, 1996

Related U.S. Application Data

[63] Continuation of application No. 08/186,687, Jan. 25, 1994, abandoned.

[51] Int. Cl.$^6$ .................................................. G06F 12/16
[52] U.S. Cl. ............................................................ 711/162
[58] Field of Search .................................. 395/438, 439, 395/440, 441, 488, 489; 711/111, 112, 113, 114, 161, 162

[56] References Cited

U.S. PATENT DOCUMENTS

| | | | |
|---|---|---|---|
| 4,092,732 | 5/1978 | Ouchi | 364/900 |
| 4,761,785 | 8/1988 | Clark et al. | 371/51 |
| 4,959,774 | 9/1990 | Davis | 364/200 |
| 5,072,378 | 12/1991 | Manka | 395/575 |
| 5,101,492 | 3/1992 | Schultz et al. | 395/575 |
| 5,148,432 | 9/1992 | Gordon et al. | 371/10.1 |
| 5,195,100 | 3/1993 | Katz et al. | 371/66 |
| 5,233,618 | 8/1993 | Glider et al. | 371/68.1 |
| 5,249,279 | 9/1993 | Schmenk et al. | 395/425 |
| 5,274,799 | 12/1993 | Brant et al. | 395/575 |
| 5,305,326 | 4/1994 | Solomon et al. | 371/11.1 |
| 5,369,641 | 11/1994 | Dodt et al. | 371/2.2 |
| 5,455,409 | 10/1995 | Smith et al. | 235/385 |
| 5,502,811 | 3/1996 | Ripberger | 395/182.04 |

OTHER PUBLICATIONS

Patterson et al., A case for Redundant Arrays of Inexpensive Disks (RAID) University of California, Berkely, CA, undated.
NCR Disk Array Controller—Application Notes, No. 5, Dec. 16, 1991.
Schroeder, "DEC Division Unleashes Barrage of High–End Storage Options.", Dec. 27, 1993, PC Week v10 n51.
Simpson, "Digital Linear Tape Struggles to Gain Beyond DEC Market.".,Feb. 21, 1994, Digital News & Review v11 n4.
Simpson, "DLT, 8mm Beat 4mm DAT in Reliability.", Jul. 11, 1994, Digital News & Review Jul. 11, 1994.
Stedman, "IBM Stretches Tape; Per–Megabyte Pricing to be Slashed Capacity Tripled.", Jul. 4, 1994, Computerworld v28 n27.
Narayan et al., "A Dual–Channel Analog Serve–Signal Processor For 13GB Tape Drives", IEEE. Apr. 1994, pp. 33–36.
IBM Technical Disclosure Bulletin, vol. 36 No. 3 Mar. 1993, "Tape Array Storage System", pp. 369–370.
IEEE, 1993, "Striped Tape Arrays", pp. 257–265.

*Primary Examiner*—Eddie P. Chan
*Assistant Examiner*—Kevin L. Ellis
*Attorney, Agent, or Firm*—Dike, Bronstein, Roberts & Cushman, LLP; Sewall P. Bronstein; William J. Daley, Jr.

[57] ABSTRACT

A technique for handling tape back-up data storage systems for use with a data processing system, wherein a single tape driver interface unit has a process controller for controlling access to an array of tape drive units and data storage tapes. Data is transmitted from a host unit to the interface unit via a first small computer system interface (SCSI) bus and is written into first storage regions of the tape via a second SCSI bus and is read from the tape via the second SCSI bus, the interface unit and the first SCSI bus to the host. Parity entries can be determined by the process controller for the data and written into second storage regions of the tapes via the second SCSI bus when operating in a parity mode. Unless a hard error occurs the same data transmitted by the host can be returned from the host.

28 Claims, 15 Drawing Sheets

|       | 7 | 6 | 5 | 4 | 3 | 2 | 1 | 0 |
|-------|---|---|---|---|---|---|---|---|
| 0-1   | DRIVE SEQUENCE NUMBER ||||||||
| 2-3   | NUMBER OF DRIVES ||||||||
| 4     | PARITY MODE ||||||||
| 5-7   | RESERVED ||||||||
| 8-11  | GROUP ID ||||||||
| 12-15 | HEADER FILE MARKER ||||||||
| 16-17 | MEDIA TYPE ||||||||
| 18-19 | RESERVED ||||||||
| 20-23 | FIRMWARE IMAGE SIZE ||||||||
| 24-1023 | RESERVED ||||||||

FIG. 6

|         | 7 | 6 | 5 | 4 | 3 | 2 | 1 | 0 |
|---------|---|---|---|---|---|---|---|---|
| 0-3     | HBH POINTER ||||||||
| 4-7     | GROUP ID RECHECK ||||||||
| 8-11    | PHYSICAL BLOCK NUMBER ||||||||
| 12      | STRIPE POSITION ||||||||
| 13-15   | RESERVED ||||||||
| 16-16383 | HOST DATA AREA ||||||||

FIG. 7

LOGICAL TAPE — PARITY ENABLE

| | | | |
|---|---|---|---|
| 1 | 0 | N-1 | 2N-2 |
| 2 | 1 | N | 2N-1 |
| N-1 | N-2 | 2N-3 | 3N-4 |
| N | PAR | PAR | PAR |
| STRIPE | 0 | 1 | 2 --- |

ETC.

LOGICAL TAPE — PARITY DISABLE

| | | | |
|---|---|---|---|
| 1 | 0 | N | 2N2 |
| 2 | 1 | N+1 | 2N+1 |
| N-1 | N-2 | 2N-2 | 3N-2 |
| N | N-1 | 2N-1 | 3N-1 |
| STRIPE | 0 | 1 | 2 --- |

ETC.

FIG. 8                    FIG. 8A

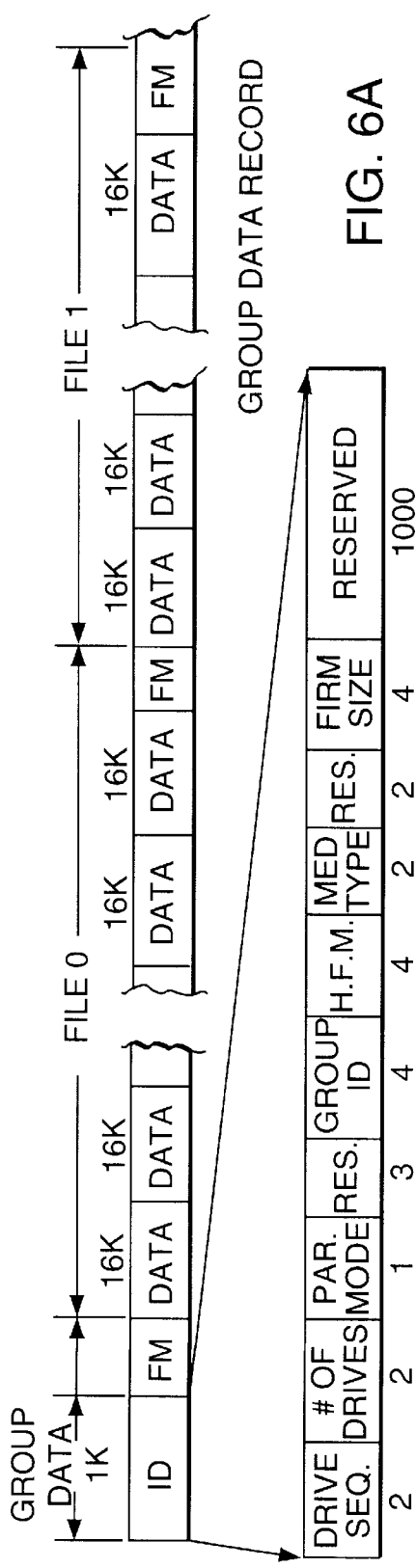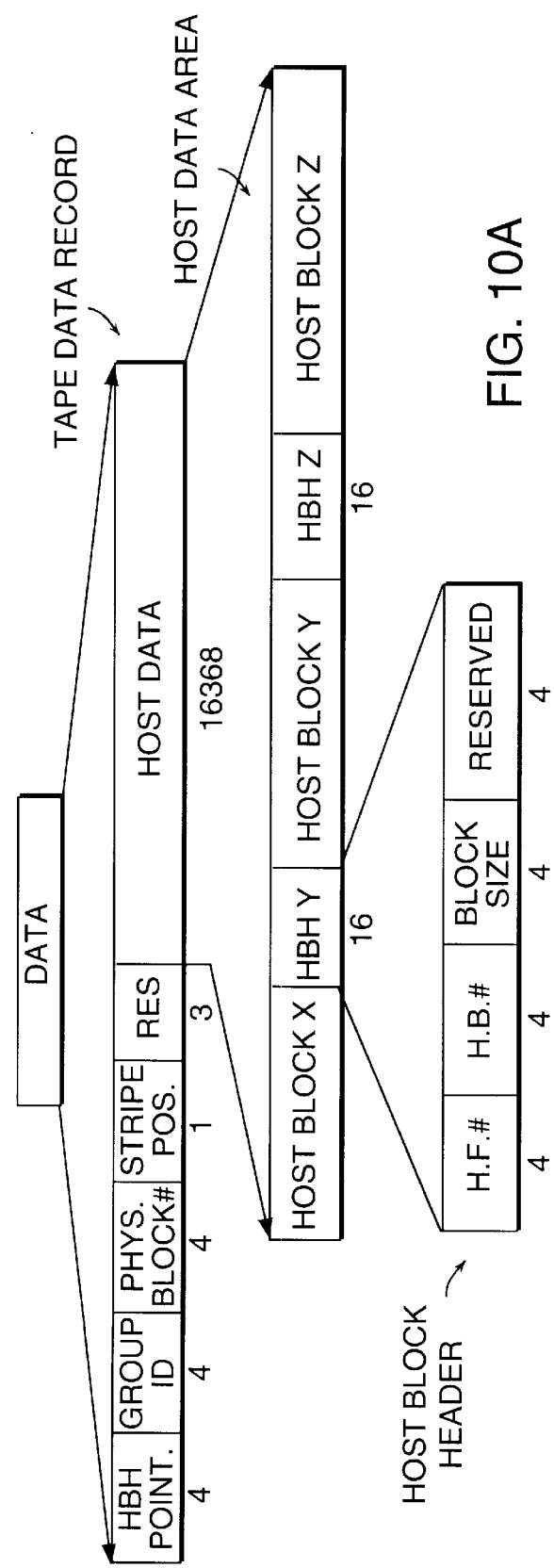

FIG. 14A

| TAPE 1 | 0 | P | N-2 |
|---|---|---|---|
| TAPE 2 | 1 | 0 | P |
| TAPE 3 | 2 | 1 | 0 |
| --- | --- | --- | --- |
| TAPE N-1 | N-2 | N-3 | N-4 |
| TAPE N | P | N-2 | N-3 |
| STRIPE | 0 | 1 | 2 ---- ETC.|

FIG. 14B

| TAPE 1 | 0 | N-1 | N-2 |
|---|---|---|---|
| TAPE 2 | 1 | 0 | N-1 |
| TAPE 3 | 2 | 1 | 0 |
| --- | --- | --- | --- |
| TAPE N-1 | N-2 | N-3 | N-4 |
| TAPE N | N-1 | N-2 | N-3 |
| STRIPE | 0 | 1 | 2 ---- ETC.|

FIG. 15

| BLK 0 | BLK 1 | BLK 2 | BLK 3 | BLK 4 | BLK 5 | BLK 6 |
|---|---|---|---|---|---|---|
| HBH 0 DATA 0 | DATA 0 HBH 1 DATA 1 | DATA 1 HBH 2 DATA 2 | DATA 2 --- EOB 0000000 | HBH 3 DATA 3 --- | DATA 3 HBH 4 DATA 4 | DATA 4 --- EOB 0000000 0000000 | FM | FM |
| 16 KB | 16 KB | 16 KB | -4KB | 16 KB | 16 KB | -2KB |
| | DATA SIZE | | | | DATA SIZE | |

FIG. 16

| | STRIPE 0 | STRIPE 1 | | |
|---|---|---|---|---|
| TAPE 0 | BLK 0 | PARITY | FM | FM |
| TAPE 1 | BLK 1 | 9KB/BLK 4 | FM | FM |
| TAPE 2 | BLK 2 | 7KB/BLK 4 + 2KB/BLK 5 | FM | FM |
| TAPE 3 | BLK 3 | 9KB/BLK 5 | FM | FM |
| TAPE 4 | PARITY | 5KB/BLK 5 + 2KB/BLK6 + 2KB/PAD | FM | FM |

| | STRIPE 0 | STRIPE 1 | STR 2 | | |
|---|---|---|---|---|---|
| TAPE 0 | BLK 0 | 2KB/PAD | BLK 5 | FM | FM |
| TAPE 1 | BLK 1 | 2KB/BLK 3 | BLK 6 | FM | FM |
| TAPE 2 | BLK 2 | 2KB/BLK 3 | BLK 4 | FM | FM |

16KB  2KB  16KB

| BLK 0 | BLK 1 | BLK 2 | BLK 3 | BLK 4 | BLK 5 | | |
|---|---|---|---|---|---|---|---|
| HBH 0<br>DATA 0<br>⋮ | DATA 0<br>HBH 1<br>DATA 1<br>⋮ | DATA 1<br>HBH 2<br>DATA 2<br>⋮ | DATA 2<br>HBH 3<br>DATA 3 | DATA 3<br>⋮<br>HBH 4 | DATA 4<br>⋮<br>EOB<br>0000000 | FM | FM |
| 16 KB | 16 KB | 16 KB | 16 KB | 16 KB | −5KB | DATA SIZE | |

FIG. 18

|  | STRIPE 0 | STRIPE 1 | | |
|---|---|---|---|---|
| TAPE 0 | BLK 0 | PARITY | FM | FM |
| TAPE 1 | BLK 1 | 6KB/BLK 4 | FM | FM |
| TAPE 2 | BLK 2 | 6KB/BLK 4 | FM | FM |
| TAPE 3 | BLK 3 | 4KB/BLK 4 + 2KB/BLK 5 | FM | FM |
| TAPE 4 | PARITY | 3KB/BLK 5 + 3KB/PAD | FM | FM |
|  | 16KB | 6KB | | |

FIG. 19

|  | STRIPE 0 | STRIPE 1 | | |
|---|---|---|---|---|
| TAPE 0 | BLK 0 | BLK 5 | FM | FM |
| TAPE 1 | BLK 1 | BLK 3 | FM | FM |
| TAPE 2 | BLK 2 | BLK 4 | FM | FM |
|  | 16KB | 16KB | | |

FIG. 20

DATA STORAGE TAPE BACK-UP FOR DATA PROCESSING SYSTEMS USING A SINGLE DRIVER INTERFACE UNIT

This application is a continuation of application Ser. No. 08/186,687 filed on Jan. 25, 1994 now abandoned.

INTRODUCTION

This invention relates to improved data storage back-up subsystems for use with data processing systems, which back-up subsystems provide high data storage capacity, high speed of operation, and reliable data retrieval capabilities.

BACKGROUND OF THE INVENTION

It is well known to those in the art that a tape medium can be used as a data storage back-up subsystem for use with data processing systems since a tape medium has a high data storage capacity. In conventional tape back-up systems a particular quantity of data can be sequentially supplied from a host computer to a tape drive interface unit which in turn supplies the quantity of data in sequence to an associated tape where, accordingly, it is sequentially stored at a current location on the tape. A subsequent quantity of data supplied by a host computer can then be subsequentially stored at an adjacent location following the location of the first quantity of data on the tape. Successive quantities, or batches, of data are likewise sequentially stored on the tape until the end of the tape is reached at which time storage of data on the tape is discontinued and the tape is manually disconnected from the host computer. A new tape is then manually substituted therefor so that further data can be stored on the new tape in the same manner. Data must then be retrieved from each tape separately. An operator selects the correct tape drive and tape combination and connects it to the host computer that is requesting access to the data on the selected tape.

Such a process is relatively slow and requires an operator to manually handle the tape drive and tape units. Moreover, if a tape drive becomes inoperative, access to the data on the tape associated with the inoperative drive cannot be accessed until a new drive unit is installed. Moreover, if some or all data on a tape becomes invalid because of an error therein, such data is not available and no technique is available for recovering the lost data.

It is desirable to be able to operate a tape back-up subsystem without the need for substantial interaction by an operator with the backup subsystem so that the subsystem can remain operable for relatively long time periods when no operator is available, e.g., overnight when such an installation is normally closed. Moreover, such subsystem should permit access to data at all times at relatively high speeds. Further, it is desirable that the subsystem be capable of reliable operation and provide an appropriate technique for recovering data even when an error occurs therein.

BRIEF SUMMARY OF THE INVENTION

In accordance with the invention, a host computer communicates with a tape drive system via a single driver interface unit which acts as the sole driver interface for the host with respect to any number of different tape drive and tape units. During operation, insofar as the host system is concerned, the tape subsystem appears to the host as a single driver unit and a single tape. Further, the interface unit is designed to operate such that if a host computer has the capability of permitting the host to access any one tape of a particular kind, it can then access an array of such tapes. Further, parity data is appropriately used on the tape units so that data can be recovered if a portion thereof is invalidated due to the presence of an error. The parity data can be placed at varying positions on different tapes and need not be located at any previously specified location on any one tape.

DESCRIPTION OF THE INVENTION

The invention can be described with the help of the accompanying drawings wherein FIG. 1 shows a block diagram of a tape array system in accordance with the invention;

FIG. 6 shows a diagrammatic representation of a single group data record in a first file of the system;

FIG. 6A shows a diagrammatic representation of the relationship of a logical tape data structure of FIG. 4 and a group data record of FIG. 6;

FIG. 7 shows a diagrammatic representation of the front of a tape data record;

FIGS. 8 and 8A show a diagrammatic representation of typical data records across a tape drive when parity is enabled and disabled, respectively;

FIG. 10A shows a diagrammatic representation of the relationship among a tape data record of FIG. 7, a head data record of FIG. 9, and a host block header of FIG. 10;

FIGS. 14A and 14B show diagrammatic representations of blocks as written into n tapes with parity enabled and disabled, respectively;

FIG. 15 shows a diagrammatic representation of an exemplary data stream for an exemplary command stream before being sent to a parity encoder;

FIG. 16 shows a diagrammatic representation of the data of FIG. 15 as physically written to n tapes, where n=5;

FIG. 17 shows a diagrammatic representation of the data of FIG. 15 as physically written into n tapes without parity, where n=3;

FIG. 18 shows a diagrammatic representation of a data stream for a different command square from that depicted in FIG. 15;

FIG. 19 shows a diagrammatic representation of the data of FIG. 18 as physically written to n tapes, where n=5;

FIG. 20 shows a diagrammatic representation of the data of FIG. 18 as physically written to n tapes without parity, where n=3;

Figure 1:
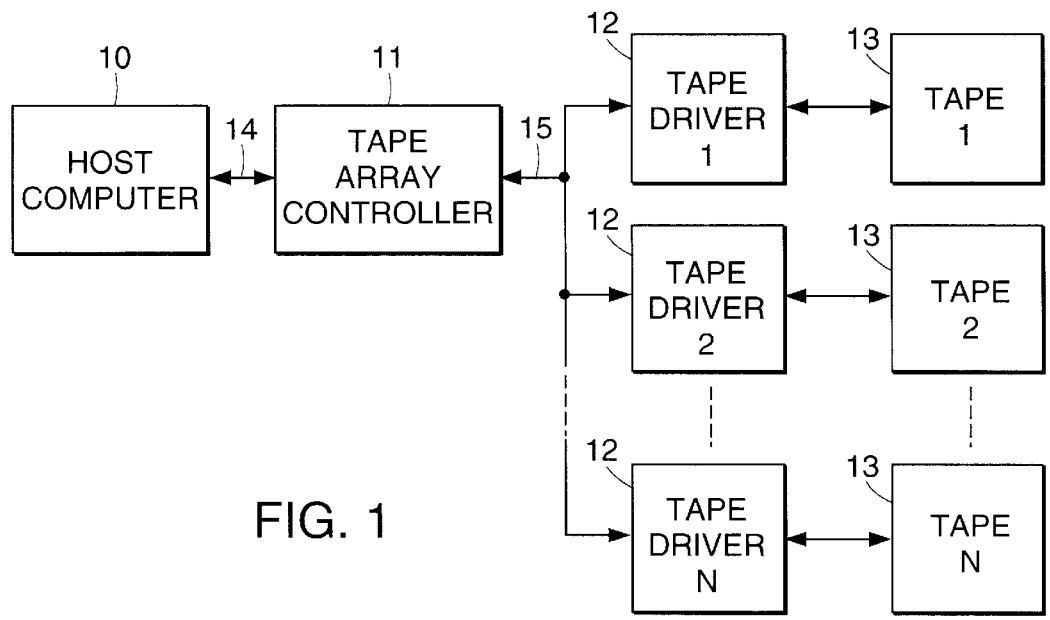

As can be seen in FIG. 1, a host computer 10 supplies data to, and receives data from, a tape array controller 11 which is in turn connected to a plurality of N tape drives 12, identified as tape drives 1, 2 . . . N, each of which drives a corresponding tape 13 for recording on, and retrieving data from, such corresponding tape. Communication between the host computer 10 and array controller 11 occurs via a well-known Small Computer System Interface (SCSI) bus 14 and communication between controller 11 and tape drives 12 occurs via a similar SCSI bus 15. The protocol and the use of such SCSI buses is standard and well known to those in the art and need not be explained in further detail here. It has been found that SCSI bus 14 preferably is a SCSI 16-bit bus carrying 20 megabytes (MB) per second bursts of data, while SCSI bus 15 preferably is a SCSI 8-bit bus carrying 10 MB/sec. bursts of data. Appropriate bus chips available to the art for these purposes can be identified as NCR53C720 and NCR53C710 chips.

Figure 2:
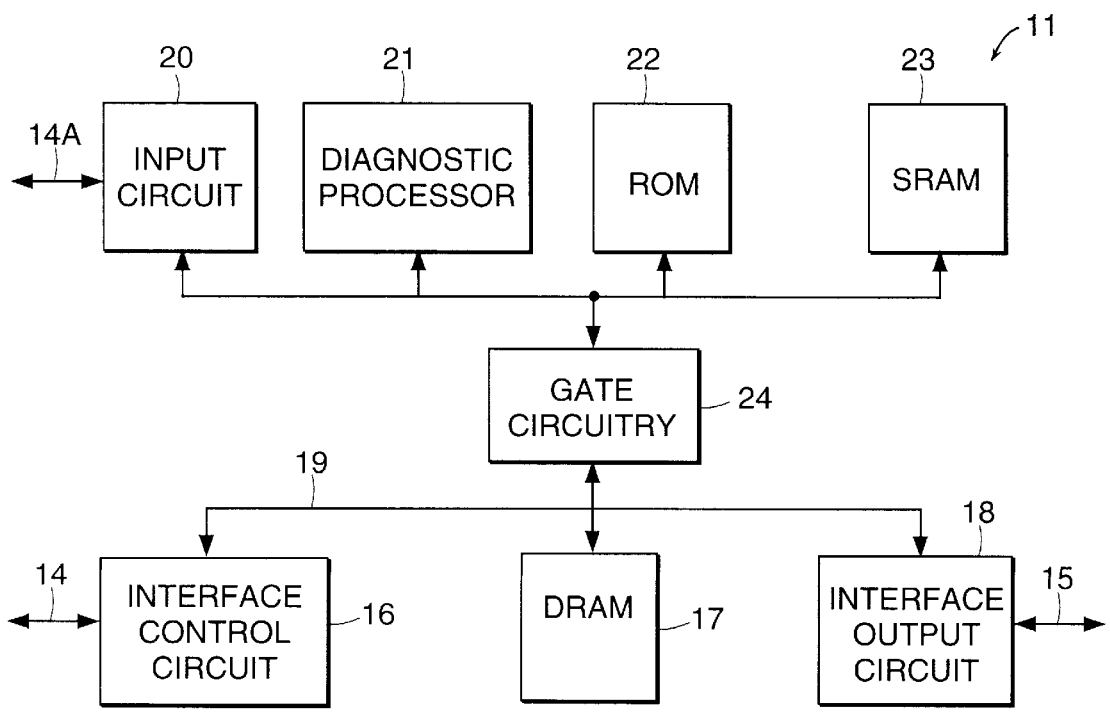
FIG. 2 shows a block diagram of the tape array controller of FIG. 1.

A block diagram of tape array controller 11 is shown in FIG. 2. Data is supplied via SCSI bus 14 to a standard SCSI interface input control circuit 16, the data being stored via internal bus 19 in a dynamic random access memory (DRAM) 17 which can store up to 1 MB of data at a time. The data is then supplied via bus 19 to a standard SCSI bus interface output circuit 18 to SCSI bus 15 and thence to the tape drives 12. Known diagnostic circuitry including a standard RS-232 bus 14A and gating circuitry 24 is used to provide well-known diagnostic commands to an input circuit 20, a diagnostic processor 21, ROM 22 and SRAM 23, the operation of which would be well-known to the art and need not be described in further detail and which do not form a part of the invention claimed.

Before describing the operation of the system shown in FIGS. 1 and 2, it is helpful to define certain terminology with which will be used herein in this connection as follows:

Stripe: A stripe is a physical block of data written to each of n tape drives in an array. The first physical block on each tape drive of the array are collectively considered as the first stripe of the tape array file system. The second physical block on each tape drive are collectively considered as the second stripe, and so on, for each subsequent physical block on the tapes.

Parity: Parity refers to the allocation of a single tape drive's physical data block within an array stripe, which block is used to hold parity data, rather than user data. The parity block for any given stripe is the logical XOR of the n−1 corresponding data blocks of the data drives in that stripe. The parity block allows for a recreation of user data in the event of a single drive failure.

Bind: Tape drives that the tape array controller 11 controls are made up of n physical tape drives which are bound into a logical group thereof. In a write operating mode, the tape array controller automatically binds all on-line tape drives at the time of the first write operation from the beginning of the tape. In the read/space mode, the controller reads the tape identification information off the various tapes in the system to determine if a readable set exists in the array. If a readable set is found, the appropriate drives are automatically bound, and the read sequence begins. Any tape drives that are bound are automatically unbound in the event of a drive failure or a rewind command.

Degraded Mode: Degraded mode is the condition wherein an array of n tape drives has encountered a failure on one of the drives thereof and the array is regenerating the missing data associated with the failed drive using the data from the non-failed drives and the parity encoded data. The throughput of the subsystem is reduced when operating in such a mode and the term degraded mode only applies to subsystems where parity generation is enabled.

Mirrored Mode: A mirrored mode is an operating condition which occurs when performing I/O operations to an n drive tape array, where n=2, with parity protection enabled. Since the parity logic XOR of a single data buffer is itself, the second drive becomes an exact image of the first drive.

At the time of the first tape motion command from the beginning of the tape (BOT) the tape array controller 11 performs a SCSI bus scan to determine the number of ready (i.e., tape loaded) tape drives. It also checks the parity setting to determine if parity generation is to be used and, based on these parameters, the controller places itself into the desired operating mode, as discussed below.

Figure 3:
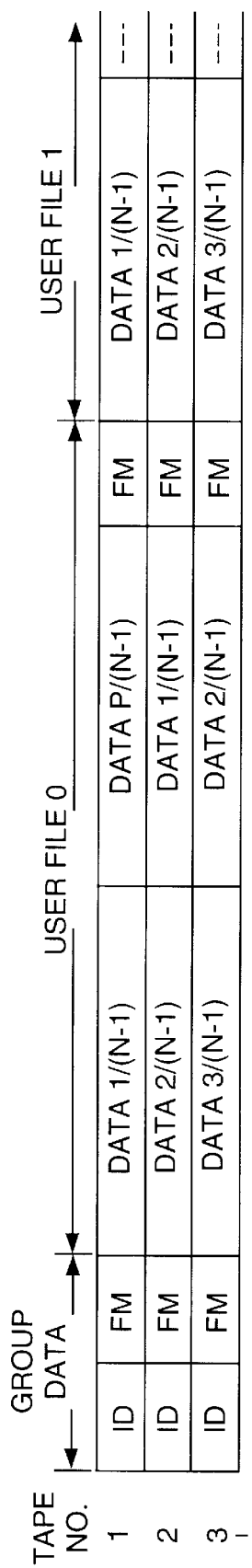
FIG. 3 shows a diagrammatic representation of the logical tape data structure for operation of the system in a first array mode.

In the standard operating mode, referred to as Array Mode 1, the array consists of n active tape drives, where n is equal to 2 or more, and the parity mode is enabled, so that each stripe contains a parity block. A degraded array mode can be entered in this Array Mode if a single tape drive encounters a failure. The logical tape data structure used in Array Mode 1 is shown in FIG. 3.

Figure 4:
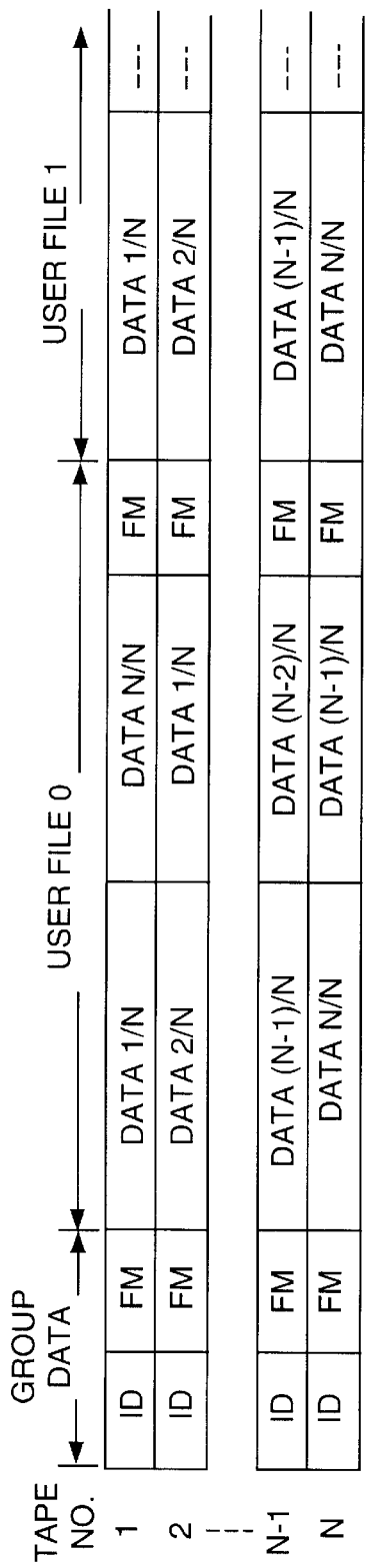
FIG. 4 shows a diagrammatic representation of a logical tape data structure for operation of the system in a second array mode.

In a second mode, referred to as Array Mode 2, or non-redundant mode, the array consists of n active tape drives, where n is equal to 2 or more, and the parity mode is not enabled, so that all stripes contain user data only. A degraded mode is not possible in Mode 2, since the data is not parity protected. In the event of a single tape drive failure the array system fails. The logical tape data structure in such non-redundant Mode is shown in FIG. 4.

Figure 5:
FIG. 5 shows a diagrammatic representation of a logical tape data structure for operation of the system in a third array mode.

In a third mode, referred to as Array Mode 3, or pass-through mode, the array subsystem consists only of a single active tape drive. All data is passed through the controller 11 directly to the single tape drive and no array information is written to the tape medium. This mode is provided to allow data interchange between the tape drive and the host into and out of an array. The physical tape data structure in such pass-through Mode is shown in FIG. 5.

While the tape array controller 11 is operating in Array Modes 1 or 2, the host data is not passed directly to the tape drives. Instead, it is placed onto the tapes under the array controller's file system. This file system contains all the information needed for the controller to recover the host data in the event of a single drive failure, as well as to perform tape positioning operations. The controller file system consists of several major parts, including a group data record, a tape data record, a parity block, and a file mark.

The first file on an array tape consists of a single group data record, invisible to the user, defined as shown in FIG. 6, in which the following definitions apply. An illustration of the relationship of a logical tape data structure (e.g., FIG. 4) and a group data record (FIG. 6) is shown in FIG. 6A.

Drive Sequence Number

The position of this particular drive in the set, e.g. 1st position of the set, 2nd position of the set, etc.

Number of Drives

The total number of drives in the tape set.

Parity Mode

A bit indicating whether parity protection is or is not enabled on the tape set.

Group ID

A random 32-bit number assigned to the tape set.

Header File Marker

An validation word indicating that a particular data record is a valid tape descriptor block.

Media Type

An indication of the type of data on the tape, i.e., user data tape, a tape drive firmware image tape, or a tape controller firmware image tape.

Firmware Image Size

If the Media Type indicates that the tape is a firmware image tape, this field contains the size of the firmware, in bytes, that should be installed.

On Write operations from BOT (Write, Write FM, etc.), this record is written to each active tape in the array.

On Read operations from BOT (Read, Space, etc.) this record is read from each active tape in the array to determine if a valid tape set has been loaded in the array.

Tapes are not required to be loaded in the same physical drive they were written to, since the tape array controller correctly assembles the host data based on the sequence information in the group header block.

A full set of "x" tapes is required for read operations. The value of x is not related to the number of drives present in the array n, but rather is the number of tapes loaded in the array at the time at which this particular set of tapes was created. As long as the user has enough physical drives to load the physical number of tapes written, a read operation can take place. For example, the controller will be able to read an array tape set written for x tapes, e.g. where x=3, when these three tapes are loaded into any three of n tapes of a tape array subsystem, e.g., where n=5.

If parity was enabled on the tapes when they were written, the tape array controller can read the host data if only x−1 tapes have been loaded by placing itself into a degraded mode for the read operation.

A Data Record is a fixed size record written to a tape drive in the array, which contains encoded host data. The format of a Data Record is shown in FIG. 7.

The host block header (HBH) pointer, located in the first word of every data record, points to a host block header (HBH) in this physical block, usually the first HBH. If there are no HBHs in this physical block, the pointer is NULL. It is possible to encounter a Data Record with one or more HBHs, but which has a NULL pointer. This condition is usually the result of a Data Record resize operation, and is not considered an error. The HBH pointer allows the controller to space into a physical file and recover the logical data stream at any point in the file.

The second longword in the data record contains the Group ID assigned to the tape set. This ID is checked on read operations as an extra data integrity check, i.e., to guarantee that the array has not spaced the tapes into a position where it is trying to read data from different write operations.

The third longword in the data record contains the physical block number of the record. All data records across the tape drives are numbered from the last filemark, as shown in FIGS. 8 and 8A when parity is enabled and disabled, respectfully.

The next byte in the data record indicates the stripe position, i.e., the sequence position of the buffer within the stripe.

Figure 9:
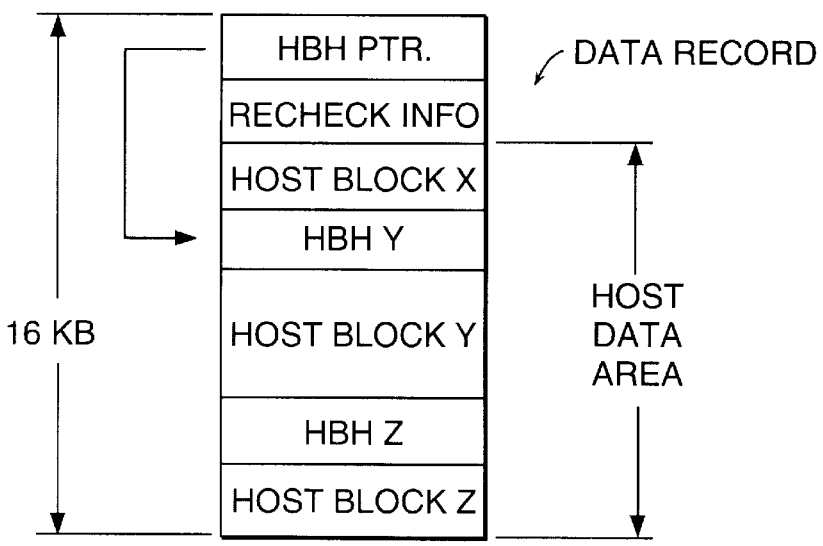
FIG. 9 shows a diagrammatic representation of a typical host data record.

The host data area consists of an alternating series of host block header (HBH) areas and host data areas, in a form shown in FIG. 9.

Figure 10:
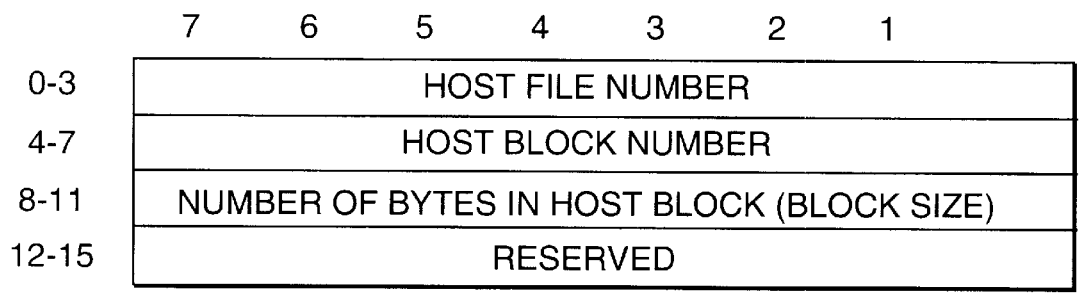
FIG. 10 shows a diagrammatic representation of a typical host block header.

The Host Block Header (HBH) is a marker separating data from different logical blocks and is defined as follows as shown in FIG. 10.

The Host File Number is the Logical (Host) file number of the block.

The Host Block Number is the logical (Host) block number of the block. It should be noted that this number is not the same as the physical block number, i.e., the number listed at the top of the physical data block.

The Blocksize is the number of bytes in the logical (Host) block. The block size number value bears no relation to the physical data block size.

An illustration of the relationship array between a tape data record (FIG. 7), a host data area (FIG. 9) and a host block header (FIG. 10) is shown in FIG. 10A.

Figure 11:
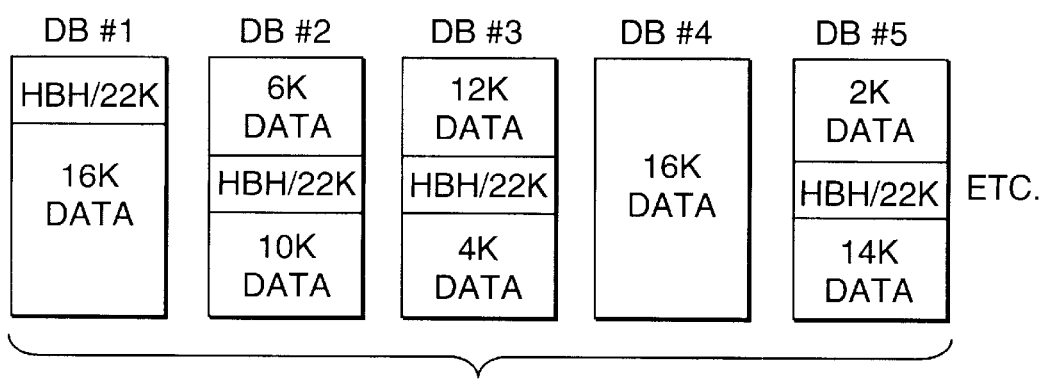
FIG. 11 shows a diagrammatic representation of a plurality of data blocks.

Each HBH is followed by the host data for the logical block defined by that HBH. If the data for a logical block is larger than the physical block size (e.g., 16 KB), the data spills over multiple physical blocks. These multiple physical blocks will not contain duplicate HBHs for the logical blocks. Thus, it is possible to have a physical block that contains no HBHs at all, as shown by the example depicted for data blocks (DB #1, DB #2, etc.) in FIG. 11.

Figure 13:
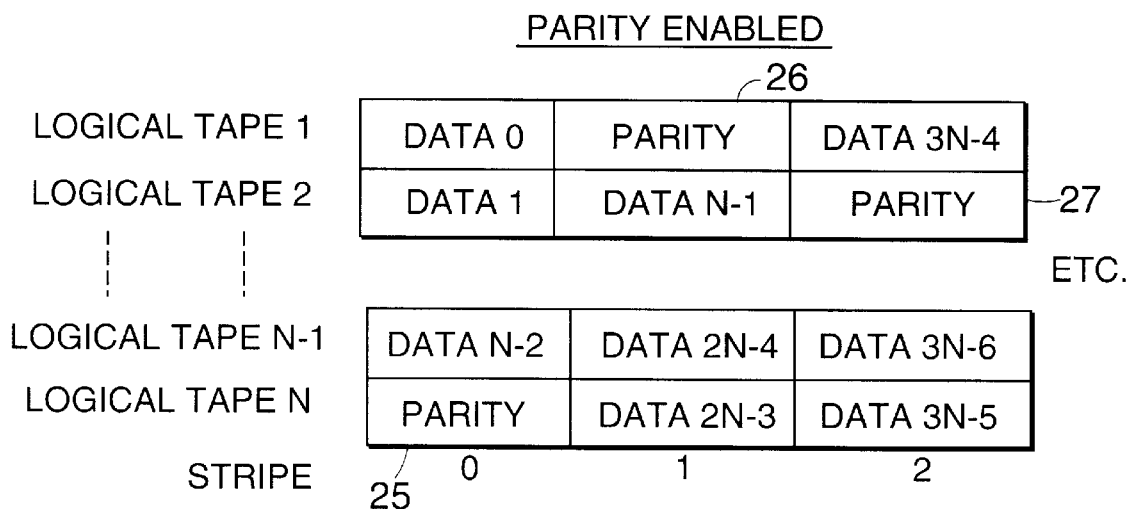

Each Parity Block is the vertical XOR parity of the physical blocks on the data drive of that stripe. Thus, as shown in FIG. 13, the first parity block 25 is the XOR of the blocks of physical data 0,1, . . . , n−2, the second parity block 26 is the XOR of the blocks of physical data n−1, n, . . . , 2n−3, the third parity block 27 is the XOR of the blocks of physical data 2n−2, 2n−1, . . . , 3n−4, and so forth.

Figure 12:
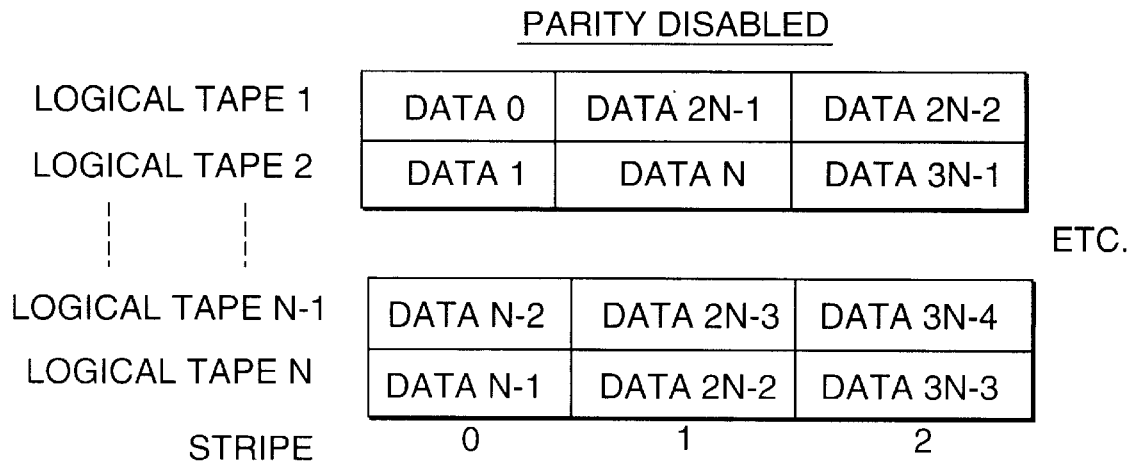
FIGS. 12 and 13 show diagrammatic representations of data blocks across n tape drives when parity is disabled and enabled, respectively.

If parity has been disabled, each parity block is replaced with a data block as shown in FIG. 12.

Filemarks are used at the end of a particular user's data and are supplied by the host computer to signify such condition. All user filemarks are written to all tape drives in the array. When a Write Filemark command is received from the host, the system flushes (writes to tape) all data in the DRAM 17 buffer memory. In doing so it must determine whether the user's data has completely filled the last data block used or whether the data does not completely fill the last data block. If the system has an incompletely filled data block at the end of the user's data, the system writes an End of Buffer (EOB) mark (i.e., the block size field in the HBH is zero signifying that the data being supplied by the particular user is complete). The EOB mark is written in the last data block at the end of the data therein and the remaining area of the data block is "padded" with zeros.

If the system has an incomplete set of data buffers (i.e., if the set is <(n−1) when parity is on or <(n) when parity is off), the system must resize the data blocks into a specified number of data blocks of equal size, but less than the total size of a normal block, i.e., (n−1) or (n) depending on whether parity is used. For example, if a data block size, in a particular embodiment, is 16 KB, each data block which forms the incomplete set thereof is resized to the same number of KB, less than 16 KB, in multiples of 1 KB.

If parity is being used and there are reduced size data blocks, a reduced size parity is calculated based on the reduced size data blocks and the n data and parity blocks are written to the tape herein. A write Filemark command is then sent to each tape drive to signify the end-of-file (EOF).

It should be understood that an end-of-buffer (EOB) mark in a data block does not signify a logical end-of-data (EOD) or end-of-file (EOF) mark since there may be more data in the next buffer. An EOB mark only indicates that there is no more data in a particular buffer to be processed. A host's data file does not end until the host sends an EOF mark. Accordingly, it is possible to have multiple sized physical blocks which represent a single host data file.

While the above discussion is in the context of a set of logical tapes numbered from 1 to n, the data from the host is packaged into data and parity blocks and written sequentially into such a logical tape set and is read back in the same manner. However, the data and parity blocks are not written to the physical tape drives in the same manner. In order to balance the data compression load across the physical tape drives, the stripe sequence is shifted by one physical drive for every stripe that is written. A map of the stripes, with buffers numbered from 0 to n−1 for each stripe, would appear as shown in FIGS. 14A and 14B, for parity enabled and disabled, respectively. Thus, with parity enabled for five tape drives (n=5), the physical data for stripe 0 is written from four buffers (0 to 3) into tapes 1–4 and parity is written into tape 5, as shown in FIG. 14A. For stripe 1, the sequence is shifted by one physical drive so that data is written into tapes 2–5 and parity is written into tape 1. For stripe 2, another shift occur and data is written into tapes 3–5 and 1 and parity is written into tape 2, and so forth. If parity is disabled, similar shifts occur with respect to data without parity, as shown in FIG. 14B.

A specific example of a host writing data to a tape is discussed below with reference to FIGS. 15, 16 and 17. In such example the following command stream occurs:

| Write | 3X | 16 KB |
| Write | 0  | FM    |
| Write | 2X | 16 KB |
| Write | 2X | FM    |

In accordance therewith, three 16 KB data blocks are first written, an end-of-buffer mark is specified but no filemarks are specified or written, thereby causing the data to be written to the tapes, two more 16 KB data blocks are written and a double filemark is written, a double filemark in a particular embodiment being used to signify the end of a file. The resultant data stream is shown in FIG. 15 before being sent to a parity encoder and consists of a first 16 KB block (Block 0) which contains the header for Data 0 and a portion of the 16 KB data of Data 0 to fill out the block. The next block (Block 1) contains the remainder of Data 0, the header for the Data 1, and a portion of Data 1 to fill the block. Block 2 contains the remainder of Data 1, the header of Data 2, and a portion of Data 2 to fill the block. Block 3 can contain less than a full block size, e.g., less than 16 KB of data, since it needs to contain only the remaining portion of Data 2, an end-of-buffer indication and enough zeros to pad the block so as to fill out the block. Block 4 thereupon contains a header for Data 3 and a portion of Data 3. Block 5 then contains the remainder of Data 3, a header for Data 4, and a portion of Data 4. Block 6 can then also have a reduced data content (e.g., 2 KB) so as to contain the remainder of Data 4, an EOB notation, and a pad of zeros to fill out the block. The two file marks are written to the tape.

The manner in which such data blocks of FIG. 15 are physically written to the stripes of a plurality of tapes is shown in FIG. 16, when parity is enabled and n tapes are used (where n=5). The first four blocks (Blocks 0–3 of the data stream of FIG. 15) are written into the first four Tapes 0–3 of Stripe 0, together with parity for such blocks, which is written into tape 4 of Stripe 0. Because the remaining data blocks (Blocks 4, 5 and 6) of FIG. 15 will not fill up a full stripe, in order to conserve tape space they can then be written into a stripe of reduced size, e.g., a 9 KB Stripe 1, wherein the data is shifted to tapes 1–4 and parity for such data is written into tape 0. Accordingly, 9 KB of data, including the header for Data 3 and a portion of Data 3, from Block 4 is written into Tape 2 of Stripe 1. The remaining 7 KB from Block 4 and 2 KB of Data 3 from Block 5 are written into Tape 2. The header of Data 4 and a portion of Data 4 from Block 5 are written into Tape 3, while the remainder of Block 5 and Block 6, and 2 KB of zero padding are written into Tape 4. Corresponding parity is written into Tape 0. File markers are then written twice on each tape.

In a similar manner, when parity is disabled and three tapes (n−3) are used, the physical locations of the data in Blocks 0–6 of FIG. 15 are written as shown in FIG. 17, there being only 16 KB needed in Stripes 0 and 2, with only 2 KB needed in Stripe 1.

If the Write 0 FM command (as discussed in the above example) is deleted from the command sequence the resultant serial data stream, before it is sent to the parity encoder to be written across n tapes, would be as shown in Blocks 0–5 in FIG. 18. With parity enabled the data from the blocks of FIG. 18 are written to five tape drives, as shown in FIG. 19, in Stripes 0 and 1, Stripe 1 being capable of further reduction in size to 6 KB (as compared with the 9 KB Stripe 1 of FIG. 16), representing a savings of 15 KB across the n tape drives. With parity disabled, the data of FIG. 18 is written to three tape drives, using two 16 KB Stripes as shown in FIG. 20, representing a savings of 6 KB across the three tape drives as compared with the added 2K Stripe needed in FIG. 17.

FIGS. 21–26 depict diagrams of flow charts for processes utilized in performing certain operations used in the tape array back-up system of the invention. The design of specific implementations of such flow charts by particular programs to be performed by the tape array controller of FIG. 1 would be well within the skill of those in the art from the above description of the system and a knowledge of such flow charts. Such specific implementations would depend on the particular data processing system used in the controller and such programs need not be described in further detail here.

Figure 21:
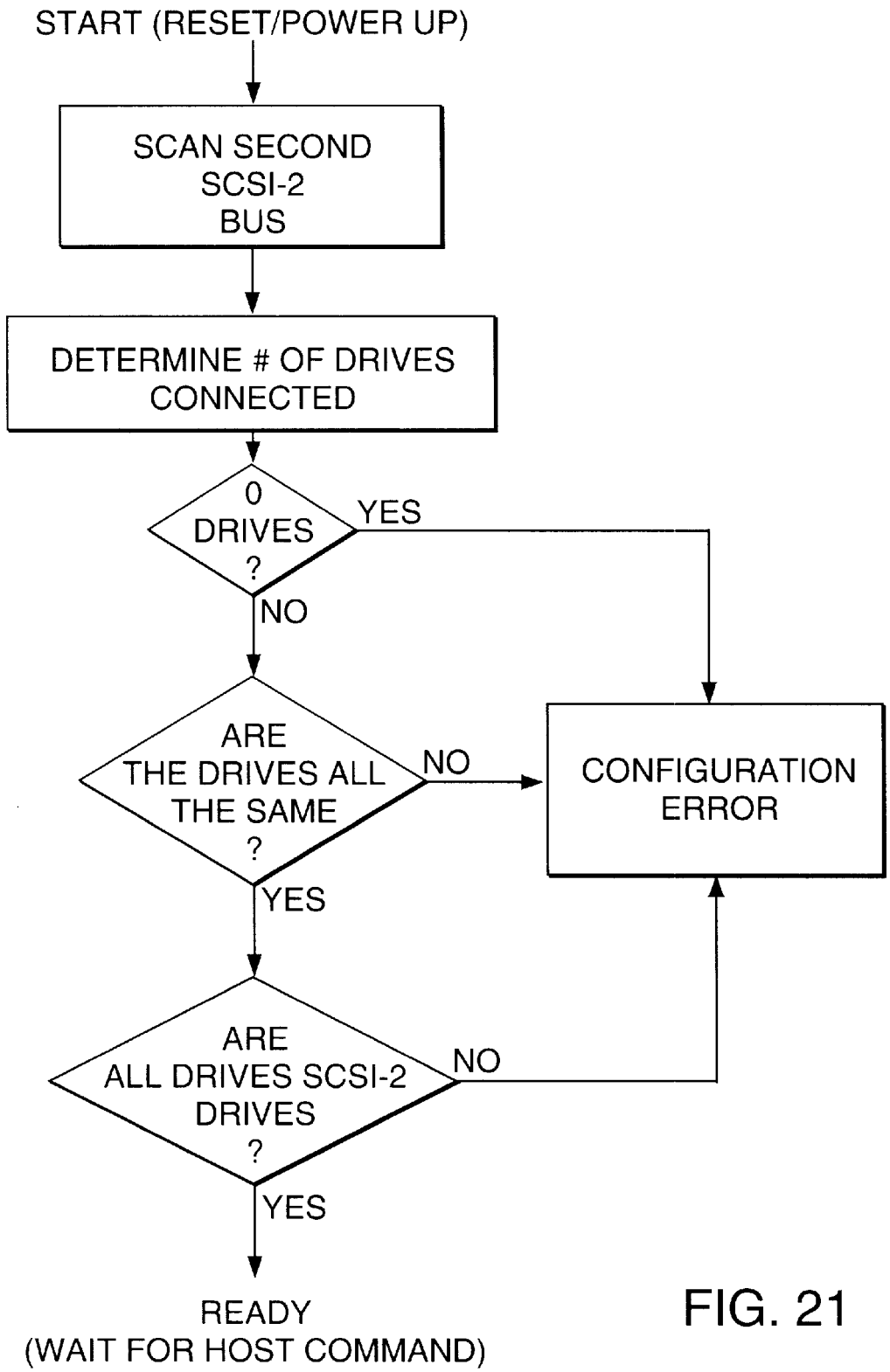
FIG. 21 shows a flow chart diagram of a process for initially configuring a tape array of the invention.

Thus, in FIG. 21, the controller performs the steps of the flow chart shown therein to initialize a tape array configuration that is to be used for a back-up operation. In accordance therewith, the second SCSI bus 15 (SCSI-2) is scanned to determine the number of tape drives which are connected thereto. If none are connected, a configuration error is reported, while if one or more are connected, a determination is made as to whether all drives are of the same type and whether all drives are SCSI-2 drives. If not, then configuration errors are also reported. The configuration is complete if no errors are reported and the system is ready for a host command.

Figure 22:
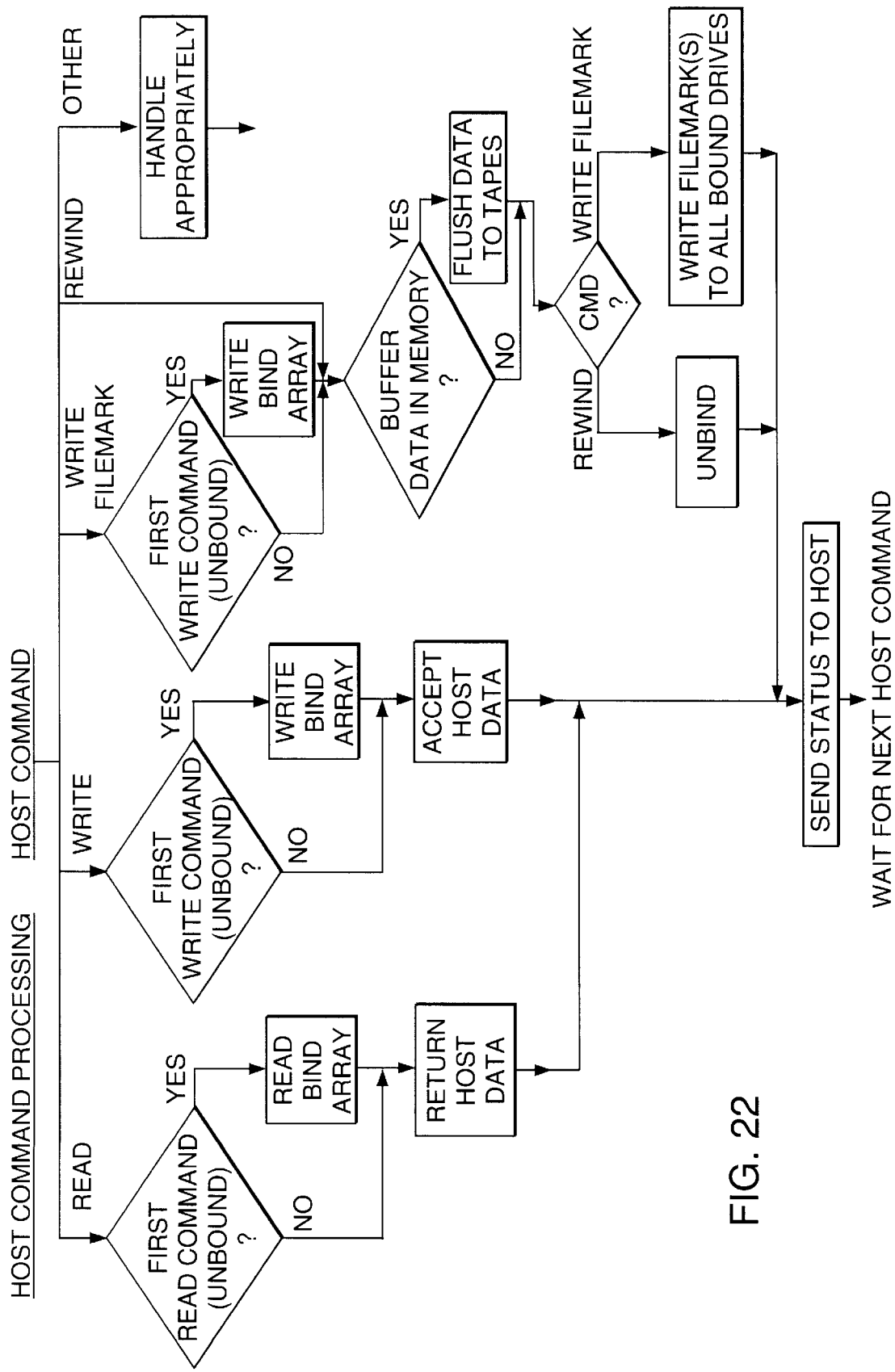
FIG. 22 shows a flow chart diagram of processes for handling host commands in a tape array of the invention.

A general flow chart design depicting processes used for various host commands is shown in FIG. 22 for the most used commands, e.g., read, write, rewind and write file mark commands requiring the programs, as discussed further below, when using configured, or bound, tape arrays of the invention. Other specialized commands, which may be needed in particular applications, can also be devised by those in the art. If the tape drives of the array are not bound, i.e., the command is the first read or first write command, the tape drives must be bound before such commands can be processed, as discussed with reference to FIGS. 23 and 24, respectively.

Figure 23:
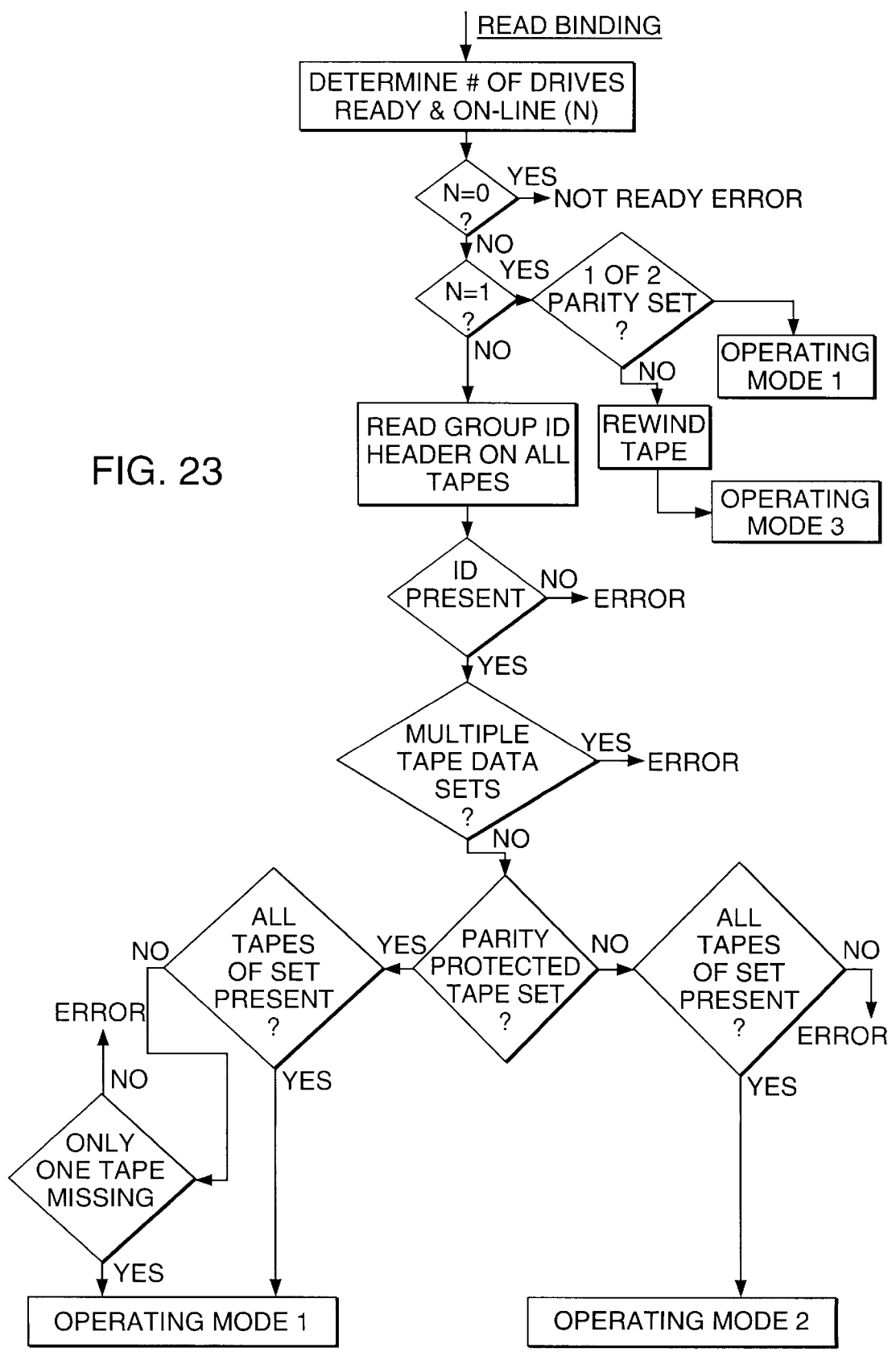
FIG. 23 shows a flow chart diagram of a process for providing a read binding operation in the tape array of the invention.

Thus, in order to initialize a read binding sequence for a tape array, the controller performs the steps of the flow chart shown in FIG. 23. In accordance therewith, the number of drives n which are ready and on line for a read operation is determined and, if none are ready, a not ready error is reported to the controller. If only a single drive is ready and if the tape has been originally written as a 1-of-2 parity set of tapes, operation in parity Array Mode 1 is used, while, if parity is not set, a single pass-through Array Mode operation 3 is used. When n is greater than 1, (multiple tape drives are ready), the group ID header is read on all tapes to determine if the number of identified tapes involved is correct for the data set being read. If all group ID headers are not present, an error is reported. If all group ID headers are present, the number of tape data sets present is determined and, if more than one, i.e., multiple tape data sets are present, an error is reported. If only a single tape data set is present, a determination is made as to whether or not parity has been set. If no parity is set and all tapes of the set are present, operation in non-redundant Array Mode 2 is used, while, if all tapes are not present an error is reported. If parity is set and all tapes are present parity Array Mode 1 is used. If only one tape is missing, operation in Array Mode 1 can still be used by using parity and reconstructing the data in the missing tape, i.e., operating in a degraded mode of Array Mode 1. If more than one tape is missing, an error is reported. Once the read binding sequence is completed, the status of the tape array is reported to the host and the data can be accessed and returned to the host.

Figure 24:
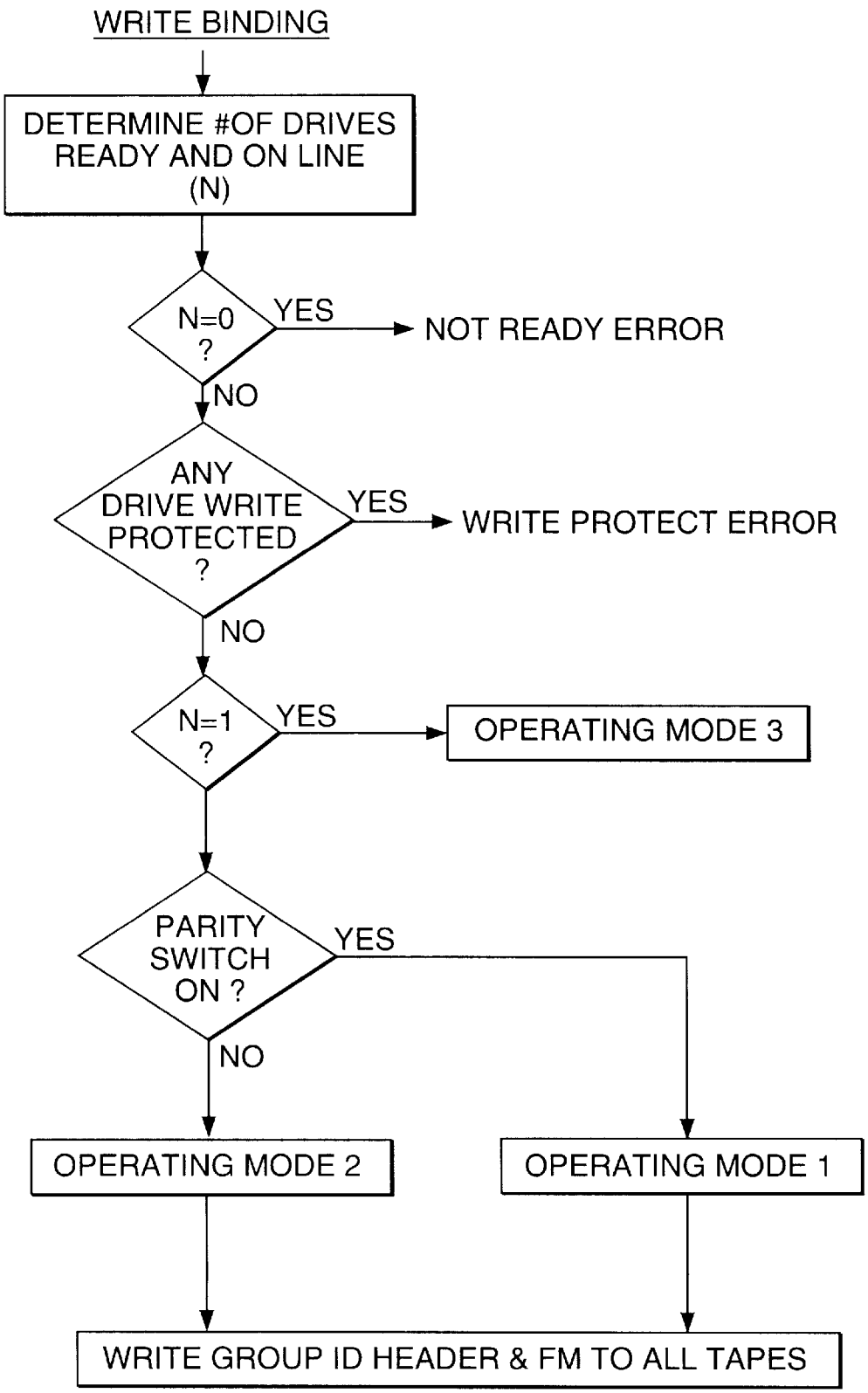
FIG. 24 shows a flow chart diagram of a process for providing a write binding operation in the tape array of the invention.

In order to initialize a write binding sequence for a tape array, the controller performs the steps of the flow chart shown in FIG. 24. In accordance therewith, the number of drives n which are ready and on-line for a write operation is determined. If none are ready and on-line, an error is reported to the controller. If one or more tapes are ready, a determination is made as to whether any of the tapes is write protected (i.e., whether the tape is available for a write operation, e.g., whether a write enable switch is or is not activated). If any tape is not available for a write operation, a write protect error is returned. If no tape is write protected and only one tape drive is ready, a pass-through Array Mode 3 operation is used. If more than one drive is ready, the system can operate either in a parity Array Mode 1 if parity is enabled or in a non-redundant Array Mode 2 if parity is not enabled. In either case group headers and file marks (FM) are written to all tapes of the bound array and the status of the array is reported to the host and the array is ready to accept host data.

If a rewind command or a file marker command is supplied from the host (FIG. 22), and buffered data is in DRAM memory 17 of the controller, the data therein is flushed (written to tape) from the DRAM and supplied to the tapes. When no data is present in DRAM memory and the command is a write file mark command, the file marks are written to all the bound tape drives, i.e., to all new tapes of the formed configuration, and the filemark write status is returned to the host to await the next host command. When no data is present in the DRAM and the command is a rewind command, all the tapes are unbound and the tape drive unbound status is returned to the host to await the next host command.

Figure 25:
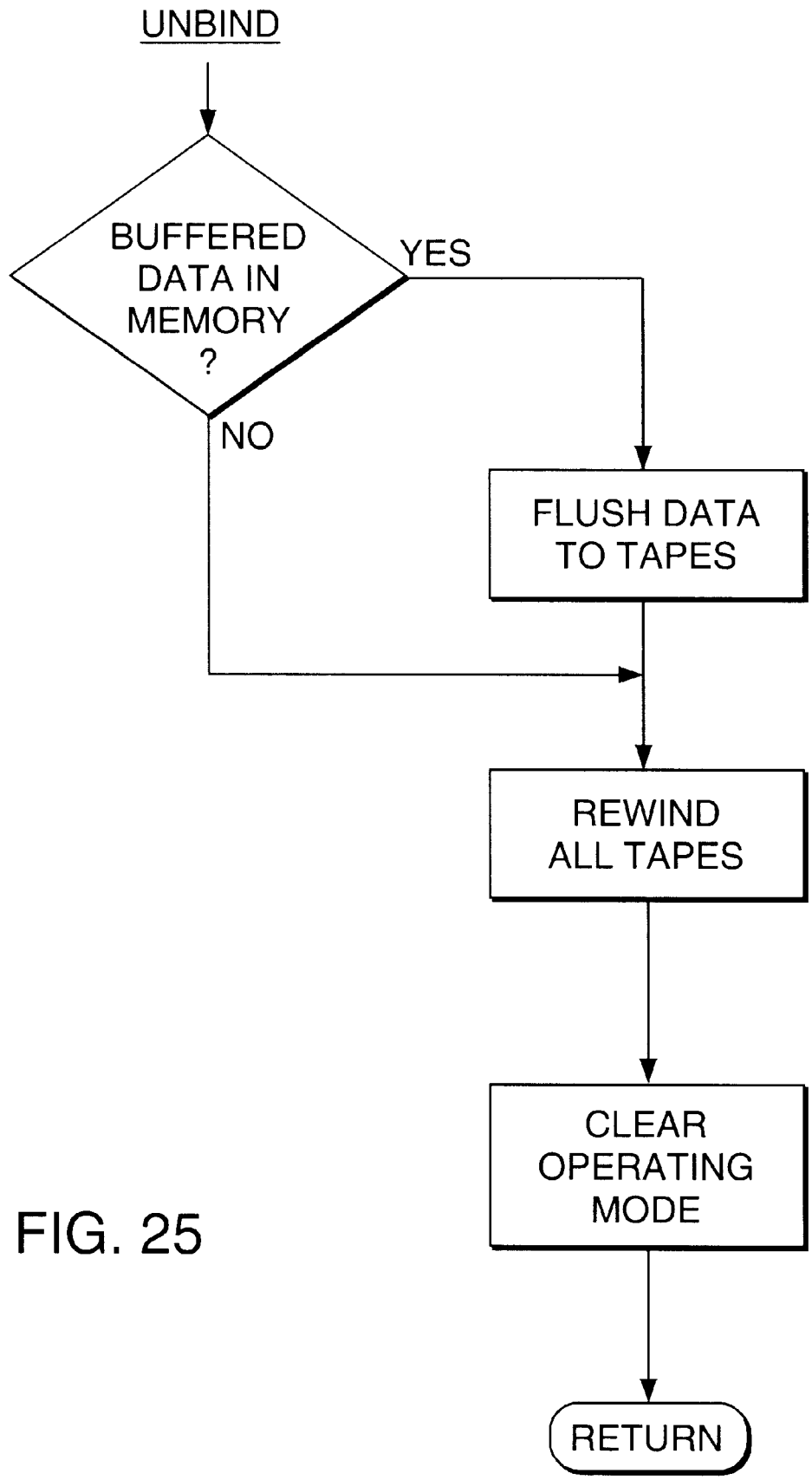
FIG. 25 shows a flow chart diagram of a process for unbinding the tape array of the invention.

FIG. 25 shows a general unbinding sequence which may arise as discussed above or at other times during operation of the system. Again, if data is buffered in DRAM memory 17 such data is first flushed from the memory and supplied to the tapes after which the tapes are rewound and the operating mode is cleared. If no data is buffered in DRAM memory 17, the tapes are rewound and the operating mode is cleared.

Figure 26:
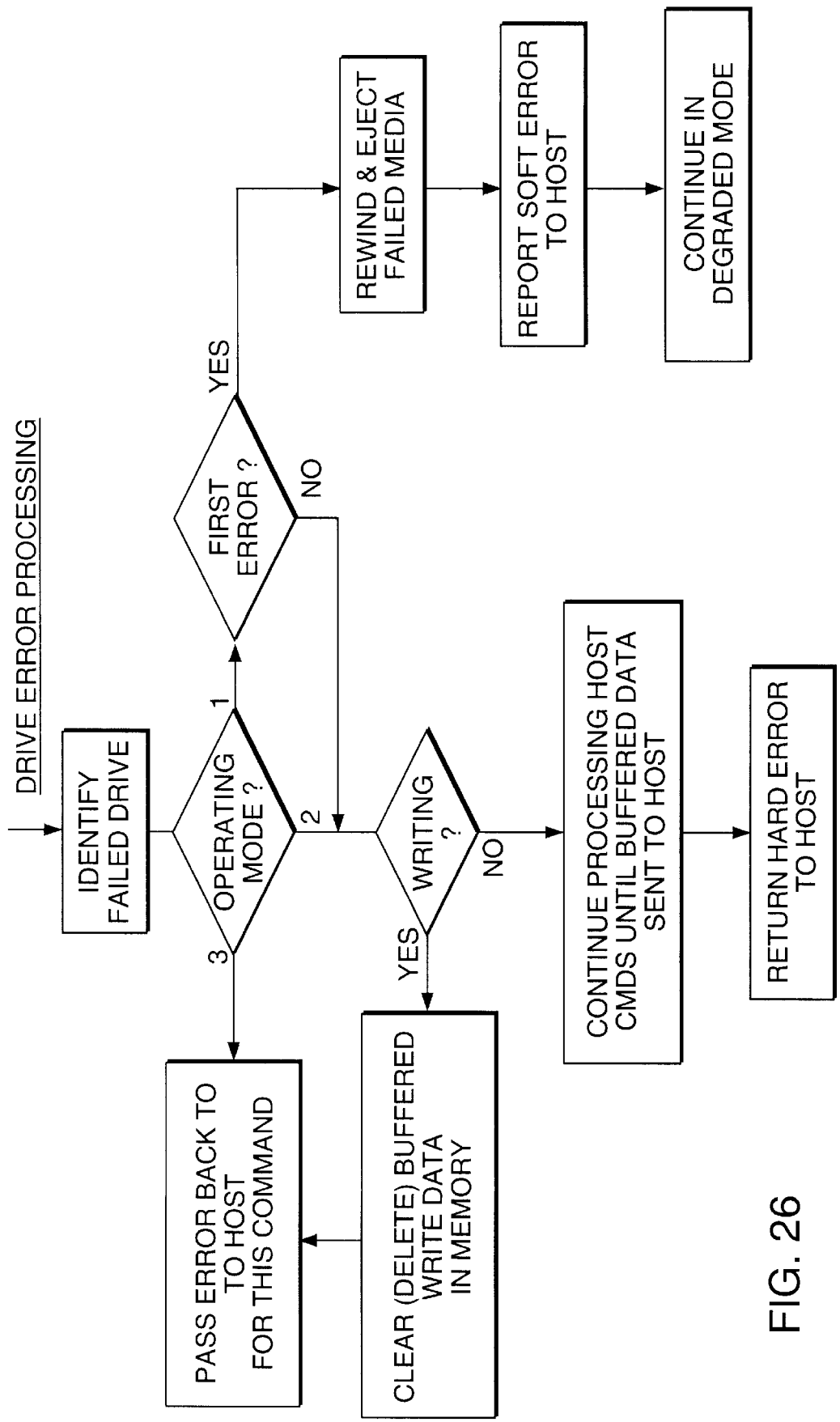
FIG. 26 shows a flow chart diagram of a process for handling a failed drive error in the tape array of the invention.

FIG. 26 shows the operations required if a failed tape drive error has been returned during operation in one of the array operating modes. As seen therein, the failed drive is identified and the particular operating mode being used is determined. If operating in a parity Array mode 1 and the failed drive error is the first failed drive error returned, the failed tape is rewound and ejected and a single failed drive error (i.e., a soft error) is reported to the host and operation in Array Mode 1 can be continued in a degraded mode, wherein the data in the failed drive is reconstructed using parity. If the failed drive error is the second failed drive error reported and a read operation is occurring, the data already read and buffered in DRAM 17 is supplied to the host, after which a hard error is reported and further processing is stopped. For a second failed drive error, if a write operation is occurring, the data in DRAM 17 is cleared (deleted) and a hard error is reported to the host.

If a non-redundant operating Array Mode 2 is being used, and a failed drive error is reported, the same processing occurs as discussed above for read and write operations for a second error condition, while if a pass-through operating Array Mode 3 is being used (i.e., the single tape drive being used has failed), a hard error is immediately reported to the host.

While the above description discloses a particular embodiment of a tape drive array in accordance with the invention, modifications thereto within the spirit and scope of the invention may occur to those in the art. Hence, the invention is not to be construed as limited to the particular embodiment disclosed except as defined by the appended claims.

What is claimed is:

1. A method for backing-up data of a processing system, comprising the steps of:

providing a data storage back-up sub-system including a single tape driver interface unit being interconnected to the processing system by a first SCSI bus and having a process controller that is interconnected to an array of N tape drive units by a second SCSI bus;

transmitting processing system data to be backed-up to the single tape driver interface unit over the first SCSI bus;

configuring the process controller so as to control the access to the N tape drive units and X data storage tapes used therewith such that the transmitted system data is written into storage regions of the X data storage tape tapes in one of at least one pre-specified operating modes, where $X \leq N$;

writing the transmitted data from the single tape driver interface unit into the tape storage regions via the second SCSI bus and the tape drive units;

reading data from the storage regions of the X data storage tapes to the single tape driver interface unit via the second SCSI bus; and transmitting the retrieved data from the single tape driver interface unit to the processing system via said first SCSI bus, so the back-up data transmitted by the processing system is returned to the processing system.

2. The method for backing-up data of claim 1 further comprising the steps of:

removing each of the data storage tapes from the tape driver units for storage separate from the processing system following said step of writing the transmitted data; and reloading the separately stored data storage tapes into the taped driver units before said step of reading data from the storage regions of the data storage tapes.

3. The method for backing-up data of claim 1 wherein the prespecified operating mode is a redundant operating mode and where N≧2;

wherein the method for backing-up data further comprises the step of determining, in the process controller, parity entries for the transmitted data; and wherein said step of writing includes writing the transmitted data into first storage regions of the data storage tapes and writing the parity entries from the single tape driver interface unit into second storage regions of the data storage tapes via the second SCSI bus and the tape drive units.

4. The method for backing-up data of claim 3 wherein parity data for successively written stripes is written so that the parity data for a successive stripe is written to a different tape than a previously written stripe.

5. The method for backing-up data of claim 1, further comprising the step of initially configuring the data storage back-up subsystem for writing data therein and reading data therefrom, where said step of initially configuring includes:

scanning the second SCSI bus to determine the number of tape drives and data storage tapes connected to the single tape driver interface unit;

determining if all connected tape drives are of the same type;

determining whether all connected tape drives are second SCSI bus drives; and reporting a ready condition if all tape drives are ready for operation.

6. The method for backing-up data of claim 5, further comprising the step of binding the tape drives for a write operation, said step of binding for a write operation including:

determining the number of tape drives ready for operation;

if no tape drives are ready, reporting an error signal to the process controller;

if at least one tape drive is ready, determining if any tape drives are write protected and, if so, reporting a write protect error to the process controller;

if only a single tape drive is ready, writing the transmitted data in a pass-through mode of operation;

if a parity operation is specified, writing the transmitted data in the redundant operating mode; and if a parity operation is not specified, writing the transmitted data in a non-redundant operating mode.

7. The method for backing-up data of claim 5, further comprising the step of unbinding a configured tape array, said step of unbinding including:

determining whether transmitted data is present in a buffer memory of the process controller and, if so:
writing the transmitted data to the data storage tapes of the array;
flushing the transmitted data from the buffer memory;
rewinding all of the data storage tapes of the configured tape array; and
clearing the operating mode of the system; and if no user data is present in the buffer memory:
rewinding all the data storage tapes of the configured tape array; and
clearing the operating mode of the system.

8. The method for backing-up data of claim 5, further comprising the step of handling a single failed tape drive error, said step of error handling including:

identifying the single failed tape drive; and determining the sub-system's operating mode.

9. The method for backing-up data of claim 8, wherein said step of error handling further includes:

if a parity mode of operation is being used, determining whether the single failed tape drive is the first failed tape drive that has occurred and, if so:
rewinding the data storage tape of the failed tape drive,
ejecting the rewound data storage tape,
reporting an error to the process controller, and
operating the configured tape array in a degraded operating mode; and if a parity mode of operation is being used and the single failed tape drive is not the first failed tape drive, then:
if in a read operation, continue the processing of host commands until user data in a buffer memory in the process controller has been sent to the host unit, and return an error to the host unit, and
if in a write operation, delete the transmitted data in the buffer memory and return an error to the host unit.

10. The method for backing-up data of claim 8, wherein the determined the operating mode is the non-redundant operating mode and wherein said step of error handling further includes continuing the processing of host commands in a read operation and returning an error to the host unit.

11. The method for backing-up data of claim 8, wherein the determined the operating mode is the pass-through operating mode and wherein said step of error handling further includes returning an error to the host unit.

12. The method for backing-up data of claim 5, further comprising the step of binding the tape drives for a read operation, said step of binding for a read operation including:

determining the number of tape drives ready for operation;

if no tape drives are ready, reporting an error to the process controller; and if only a single tape drive is ready, determining whether such tape drive was written as one of two parity protected tapes and, if so, reading said tape in a redundant operating mode and, if not, reading said tape directly therefrom using a pass-through mode of operation.

13. The method for backing-up data of claim 12, wherein said step of binding for a read operation further includes:

if more than one of the data storage tapes are ready, determining whether the number of the data storage tapes ready corresponds to the number of tapes for which the data was originally written and, if not, reporting an error to the process controller;

if the number of the data storage tapes ready is determined to correspond to the number of the data storage tapes originally written, determining whether all of the data storage tapes ready are the same data storage tapes originally written to and, if not, reporting an error to the process controller; and if all of the data storage tapes ready are determined to form a single tape set, determining whether the data stored therein is parity protected and, if not, and all data storage tapes of the set are present, operating in a non-redundant operating mode, while if not all the data storage tapes of the single tape set are present, reporting an error to the process controller.

14. The method for backing-up data of claim 13, wherein said step of binding for a read operation further includes:

if the stored data is parity protected and all the data storage tapes are determined present, operating the process controller in a redundant operating mode;

if all data storage tapes are determined not present, determining if only one data storage tape is missing, and, if so, operating in the redundant operating mode, and if more than one data storage tape is determined to be missing, then reporting an error to the process controller.

15. A method for backing-up data of a processing system, comprising the steps of:

providing a data storage back-up sub-system including a single tape driver interface unit being interconnected to the processing system by a first SCSI bus and having a process controller that is interconnected to an array of N tape drive units by a second SCSI bus;

transmitting processing system data to be backed-up to the single tape driver interface unit over the first SCSI bus;

configuring the process controller so as to control the access to the N tape drive units and X data storage tapes used therewith such that the transmitted system data is written into storage regions of the X data storage tape tapes in one of at least one prespecified operating modes, where $X \leq N$ and so the N tape drive units and the X storage tapes as well as the controlling of the access thereto are transparent to the processing system so the data storage back-up sub-system appears as a single logical unit to the processing system;

writing the transmitted data from the single tape driver interface unit into the tape storage regions via the second SCSI bus and the tape drive units;

reading data from the storage regions of the X data storage tapes to the single tape driver interface unit via the second SCSI bus; and transmitting the retrieved data from the single tape driver interface unit to the processing system via said first SCSI bus, so the back-up data transmitted by the processing system is returned to the processing system.

16. The method for backing-up data of claim 15 further comprising the steps of:

removing each of the data storage tapes from the tape driver units for storage separate from the processing system following said step of writing the transmitted data; and reloading the separately stored data storage tapes into the taped driver units before said step of reading data from the storage regions of the data storage tapes.

17. The method for backing-up data of claim 15 wherein the prespecified operating mode is a redundant operating mode and where $N \geq 2$;

wherein the method for backing-up data further comprises the step of determining, in the process controller, parity entries for the transmitted data; and wherein said step of writing includes writing the transmitted data into first storage regions of the data storage tapes and writing the parity entries from the single tape driver interface unit into second storage regions of the data storage tapes via the second SCSI bus and the tape drive units.

18. The method for backing-up data of claim 17 wherein parity data for successively written stripes is written so that the parity data for a successive stripe is written to a different tape than a previously written stripe.

19. The method for backing-up data of claim 15, further comprising the step of initially configuring the data storage back-up subsystem for writing data therein and reading data therefrom, where said step of initially configuring includes:

scanning the second SCSI bus to determine the number of tape drives and data storage tapes connected to the single tape driver interface unit;

determining if all connected tape drives are of the same type;

determining whether all connected tape drives are second SCSI bus drives; and reporting a ready condition if all tape drives are ready for operation.

20. The method for backing-up data of claim 19, further comprising the step of binding the tape drives for a write operation, said step of binding for a write operation including:

determining the number of tape drives ready for operation;

if no tape drives are ready, reporting an error signal to the process controller;

if at least one tape drive is ready, determining if any tape drives are write protected and, if so, reporting a write protect error to the process controller;

if only a single tape drive is ready, writing the transmitted data in a pass-through mode of operation;

if a parity operation is specified, writing the transmitted data in the redundant operating mode; and if a parity operation is not specified, writing the transmitted data in a non-redundant operating mode.

21. The method for backing-up data of claim 19, further comprising the step of unbinding a configured tape array, said step of unbinding including:

determining whether transmitted data is present in a buffer memory of the process controller and, if so:
 writing the transmitted data to the data storage tapes of the array;
 flushing the transmitted data from the buffer memory;
 rewinding all of the data storage tapes of the configured tape array; and
 clearing the operating mode of the system; and
if no user data is present in the buffer memory:
 rewinding all the data storage tapes of the configured tape array; and
 clearing the operating mode of the system.

22. The method for backing-up data of claim 19, further comprising the step of handling a single failed tape drive error, said step of error handling including:

identifying the single failed tape drive; and determining the sub-system's operating mode.

23. The method for backing-up data of claim 22, wherein said step of error handling further includes:

if a parity mode of operation is being used, determining whether the single failed tape drive is the first failed tape drive that has occurred and, if so:
 rewinding the data storage tape of the failed tape drive, ejecting the rewound data storage tape, reporting an error to the process controller, and
operating the configured tape array in a degraded operating mode; and
if a parity mode of operation is being used and the single failed tape drive is not the first failed tape drive, then:
   if in a read operation, continue the processing of host commands until user data in a buffer memory in the process controller has been sent to the host unit, and return an error to the host unit, and
   if in a write operation, delete the transmitted data in the buffer memory and return an error to the host unit.

24. The method for backing-up data of claim 22, wherein the determined the operating mode is the non-redundant operating mode and wherein said step of error handling further includes continuing the processing of host commands in a read operation and returning an error to the host unit.

25. The method for backing-up data of claim 22, wherein the determined the operating mode is the pass-through operating mode and wherein said step of error handling further includes returning an error to the host unit.

26. The method for backing-up data of claim 19, further comprising the step of binding the tape drives for a read operation, said step of binding for a read operation including:
   determining the number of tape drives ready for operation;
   if no tape drives are ready, reporting an error to the process controller; and
   if only a single tape drive is ready, determining whether such tape drive was written as one of two parity protected tapes and, if so, reading said tape in a redundant operating mode and, if not, reading said tape directly therefrom using a pass-through mode of operation.

27. The method for backing-up data of claim 26, wherein said step of binding for a read operation further includes:
   if more than one of the data storage tapes are ready, determining whether the number of the data storage tapes ready corresponds to the number of tapes for which the data was originally written and, if not, reporting an error to the process controller;
   if the number of the data storage tapes ready is determined to correspond to the number of the data storage tapes originally written, determining whether all of the data storage tapes ready are the same data storage tapes originally written to and, if not, reporting an error to the process controller; and
   if all of the data storage tapes ready are determined to form a single tape set, determining whether the data stored therein is parity protected and, if not, and all data storage tapes of the set are present, operating in a non-redundant operating mode, while if not all the data storage tapes of the single tape set are present, reporting an error to the process controller.

28. The method for backing-up data of claim 27, wherein said step of binding for a read operation further includes:
   if the stored data is parity protected and all the data storage tapes are determined present, operating the process controller in a redundant operating mode;
   if all data storage tapes are determined not present, determining if only one data storage tape is missing, and, if so, operating in the redundant operating mode, and if more than one data storage tape is determined to be missing, then reporting an error to the process controller.

* * * * *